US010903525B2

(12) United States Patent
Ladroue et al.

(10) Patent No.: US 10,903,525 B2
(45) Date of Patent: Jan. 26, 2021

(54) SELF-SUPPORTING THIN-FILM BATTERY AND METHOD OF MANUFACTURING SUCH A BATTERY

(71) Applicant: STMicroelectronics (Tours) SAS, Tours (FR)

(72) Inventors: Julien Ladroue, Monnaie (FR); Mohamed Boufnichel, Monnaie (FR)

(73) Assignee: STMicroelectronics (Tours) SAS, Tours (FR)

( * ) Notice: Subject to any disclaimer, the term of this patent is extended or adjusted under 35 U.S.C. 154(b) by 217 days.

(21) Appl. No.: 16/053,223

(22) Filed: Aug. 2, 2018

(65) Prior Publication Data

US 2018/0351210 A1  Dec. 6, 2018

Related U.S. Application Data

(62) Division of application No. 15/049,766, filed on Feb. 22, 2016, now Pat. No. 10,069,170.

(30) Foreign Application Priority Data

Jul. 13, 2015 (FR) .................................... 15 56660

(51) Int. Cl.
| | | |
|---|---|---|
| *H01M 10/0585* | (2010.01) | |
| *H01M 10/04* | (2006.01) | |
| *H01M 4/04* | (2006.01) | |
| *H01M 4/40* | (2006.01) | |
| *H01M 6/40* | (2006.01) | |

(52) U.S. Cl.
CPC ..... *H01M 10/0585* (2013.01); *H01M 4/0404* (2013.01); *H01M 4/0407* (2013.01); *H01M 6/40* (2013.01); *H01M 10/0436* (2013.01); *H01M 2220/30* (2013.01)

(58) Field of Classification Search
CPC ............. H01M 4/0404; H01M 4/0407; H01M 10/0436; H01M 6/40; H01M 10/0585; H01M 2220/30
See application file for complete search history.

(56) References Cited

U.S. PATENT DOCUMENTS

| | | |
|---|---|---|
| 5,561,004 A | 10/1996 | Bates et al. |
| 2004/0131925 A1 | 7/2004 | Jenson et al. |
| 2004/0185310 A1* | 9/2004 | Jenson .................... C23C 14/08 429/7 |
| 2009/0065042 A1 | 3/2009 | Reynolds |
| 2009/0214899 A1* | 8/2009 | Shakespeare ....... H01M 2/0426 429/7 |
| 2011/0311883 A1* | 12/2011 | Oukassi ............ H01M 10/0436 429/322 |
| 2012/0214047 A1 | 8/2012 | Kwak et al. |
| 2014/0273890 A1 | 9/2014 | Huang et al. |
| 2018/0131048 A1* | 5/2018 | Kwak ..................... H01M 6/40 |

FOREIGN PATENT DOCUMENTS

FR    2960346 A1    11/2011

OTHER PUBLICATIONS

INPI Search Report and Written Opinion for FR 1556660 dated Apr. 19, 2016 (7 pages).

* cited by examiner

*Primary Examiner* — Muhammad S Siddiquee
(74) *Attorney, Agent, or Firm* — Crowe & Dunlevy

(57) ABSTRACT

A self-supporting thin-film battery is manufacture by forming on the upper surface of a support substrate a vertical active stack having as a lower layer a metal layer having formed therein a first contact terminal of a first polarity of the battery and having formed therein as an upper layer a metal layer having a second contact terminal of a second polarity of the battery. A support film is then bonded to an upper surface of the upper layer. The lower layer is the separated from the substrate by projecting a laser beam through the substrate from a lower surface thereof to impinge on the lower layer.

22 Claims, 4 Drawing Sheets

SELF-SUPPORTING THIN-FILM BATTERY AND METHOD OF MANUFACTURING SUCH A BATTERY

CROSS REFERENCE TO RELATED APPLICATIONS

This application is a divisional of U.S. patent application Ser. No. 15/049,766 filed Feb. 22, 2016, which claims the priority benefit of French Application for Patent No. 1556660, filed on Jul. 13, 2015, the contents of which are hereby incorporated by reference in their entireties to the maximum extent allowable by law.

TECHNICAL FIELD

The present disclosure relates to the field of thin-film batteries.

BACKGROUND

The terms thin-film battery or microbattery are conventionally used to designate an assembly comprising a support substrate and, on a surface of the substrate, a stack of layers forming an active battery element, the stack particularly comprising a solid electrolyte layer between a negative electrode and a positive electrode. The total thickness of a thin-film battery is typically in the range from a few tens to a few hundreds of µm, for a surface area in the range from a few $mm^2$ to a few $cm^2$, which enables to house the battery in very small spaces and further enables to manufacture batteries of variable flexibility (according to the characteristics of the support substrate). To form such batteries, it is known to use techniques of sputtering through a shadow mask. Such techniques comprise placing a shadow mask above the support substrate and sputtering, through the mask, the different layers forming the active battery element. In such batteries, the positive and negative contact terminals of the battery, intended to be connected to an external device, are generally arranged on the same side of the support substrate, and have their surfaces of connection to the outside oriented in the same direction.

SUMMARY

An embodiment provides a method of manufacturing a self-supporting thin-film battery comprising the steps of: a) forming, on the upper surface of a support substrate, a vertical active stack having as a lower layer a metal layer having formed therein a first contact terminal of a first polarity of the battery and having formed therein as an upper layer a metal layer having a second contact terminal of a second polarity of the battery; b) bonding a support film to an upper surface of the upper layer; and c) separating the lower layer from the substrate by means of a laser beam projected through the substrate from a lower surface thereof.

According to an embodiment, step a) comprises the steps of: depositing the first metal layer on the upper surface of the substrate; depositing a first passivation layer on the upper surface of the first layer; and forming a first through opening in the first passivation layer opposite a non-peripheral region of the first contact terminal.

According to an embodiment, step a) further comprises depositing, on the upper surface of the passivation layer, a vertical stack comprising a metal cathode collector layer, a cathode layer, an electrolyte layer, an anode layer, and an anode collector layer.

According to an embodiment, step a) further comprises forming, from the upper surface of the stack formed by the cathode collector layer, the cathode layer, the electrolyte layer, the anode layer, and the anode collector layer, a first trench delimiting the contour of the battery, the trench emerging onto the first passivation layer.

According to an embodiment, step a) further comprises the steps of: depositing a second passivation on the upper surface of the stack formed by the cathode collector layer, the cathode layer, the electrolyte layer, the anode layer, and the anode collector layer, as well as on the walls and on the bottom of the first trench; depositing a protection resin layer above the second passivation layer; and forming a second through opening in the resin layer and in the second passivation layer opposite a non-peripheral region of the second contact terminal.

According to an embodiment, step a) further comprises depositing the last metal layer on the upper surface of the resin layer and into the second through opening.

According to an embodiment, step a) further comprises forming, from the upper surface of the active stack, a second trench delimiting the contour of the battery, the second trench being substantially aligned with the first trench but having a width smaller than that of the first trench, and emerging onto the support substrate.

According to an embodiment, a third contact terminal of second polarity of the battery, connected by a conductive via to the second contact terminal, is further formed in the first metal layer, and a fourth terminal of first polarity of the battery, connected by a conductive via to the first contact terminal, is further formed in the last metal layer.

According to an embodiment, the support film is a self-adhesive film.

Another embodiment provides a self-supporting thin-film battery, formed of a vertical active stack having as a lower layer a metal layer having formed therein a first contact terminal of a first polarity of the battery and having as an upper layer a metal layer having formed therein a second contact terminal of a second polarity of the battery.

According to an embodiment, the lower layer further comprises a third contact terminal of second polarity of the battery connected by a conductive via to the second contact terminal, and the upper layer further comprises a fourth contact terminal of first polarity of the battery connected by a conductive via to the first contact terminal.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1A:
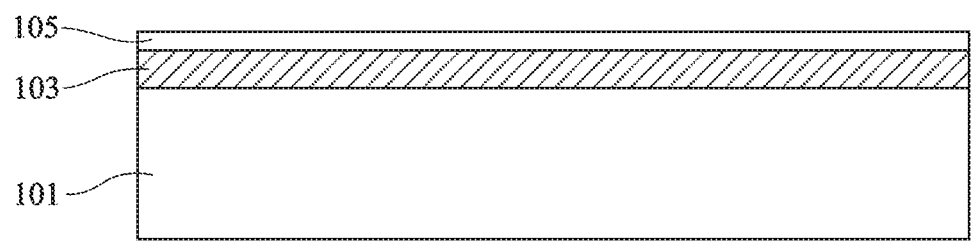
FIGS. 1A to 1K are cross-section views schematically illustrating steps of an embodiment of a method of manufacturing a thin-film battery.

The same elements have been designated with the same reference numerals in the different drawings and, further, the various drawings are not to scale. In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings, it being understood that, in practice, the shown assemblies may be oriented differently. Unless otherwise specified, expressions "approximately", "substantially", "about", and "in the order of" mean to within 10%, preferably to within 5%.

FIGS. 1A to 1K are cross-section views schematically illustrating steps of an embodiment of a method of manufacturing a thin-film battery.

FIG. 1A illustrates a step of depositing, on the upper surface of a support substrate 101, a metal layer 103 intended to form a first contact terminal of the battery, the positive terminal in the shown example. Substrate 101 is for example made of glass, of ceramic, or of silicon. Layer 103 is for example made of copper, platinum, molybdenum, aluminum, or a nickel- and chromium-based alloy of the type commercialized under trade name Inconel. As an example, layer 103 has a thickness in the range from 0.5 to 10 μm. FIG. 1A further illustrates a step of depositing, on the upper surface of layer 103, a passivation layer 105, for example, made of alumina ($Al_2O_3$) or of any other adapted dielectric material. As an example, layer 105 has a thickness in the range from 50 nm to 1 μm.

Figure 1B:
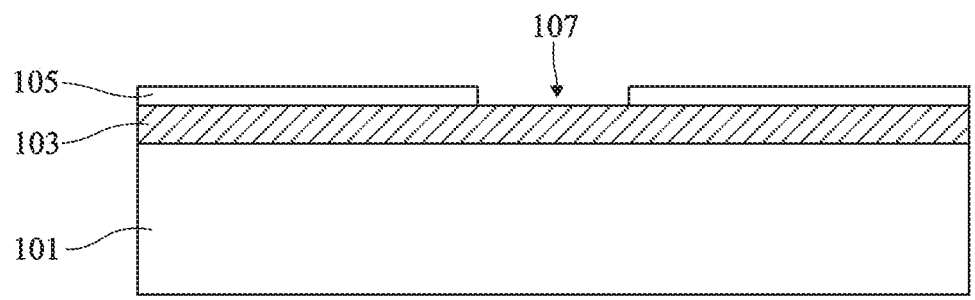

FIG. 1B illustrates a step of forming, from the upper surface of the assembly, an opening 107 in passivation layer 105, for example, in a central area of the battery or, more generally, in a non-peripheral area of the battery (that is, which does not extend all the way to an edge of the battery). Opening 107 extends across the entire thickness of layer 105, and is intended to enable to take an electric contact on the upper surface of metal layer 103 during a subsequent step. Opening 107 is for example formed by laser etching, for example, by means of an excimer laser, which has the advantage of having characteristics, and particularly a wavelength, adapted to selectively removing layer 105 over layer 103, and of enabling to cut layer 105 with a good resolution. In top view, opening 107 for example has a square, rectangular, circular, or oval shape. As an example, opening 107 has a surface area in the range from 4 $\mu m^2$ to 0.25 $cm^2$ (depending on the surface area of the battery).

Figure 1C:
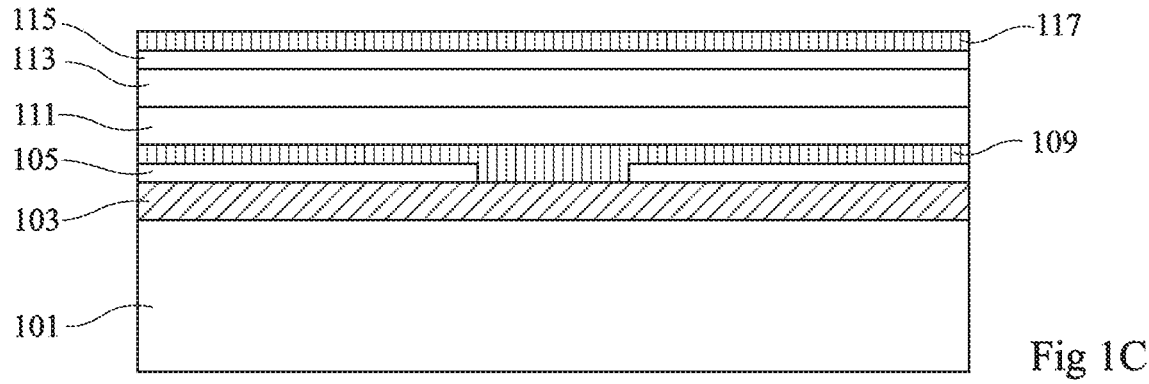

FIG. 1C illustrates a step of depositing, on the upper surface of passivation layer 105, a vertical stack comprising, in the following order from the upper surface of layer 105, a metal cathode collector layer 109, for example, made of platinum, molybdenum, aluminum, or Inconel, a cathode layer 111, for example, made of $LiCoO_2$, an electrolyte layer 113, for example, made of LiPON, an anode layer 115, for example, made of lithium, and a metal anode collector layer 117, for example, made of aluminum or copper. As an example, each of layers 109, 111, 113, 115, and 117 has a thickness in the range from 100 nm to 10 μm. At the level of opening 107 formed in passivation layer 105, cathode collector layer 109 is in contact with lower metal layer 103.

Figure 1D:
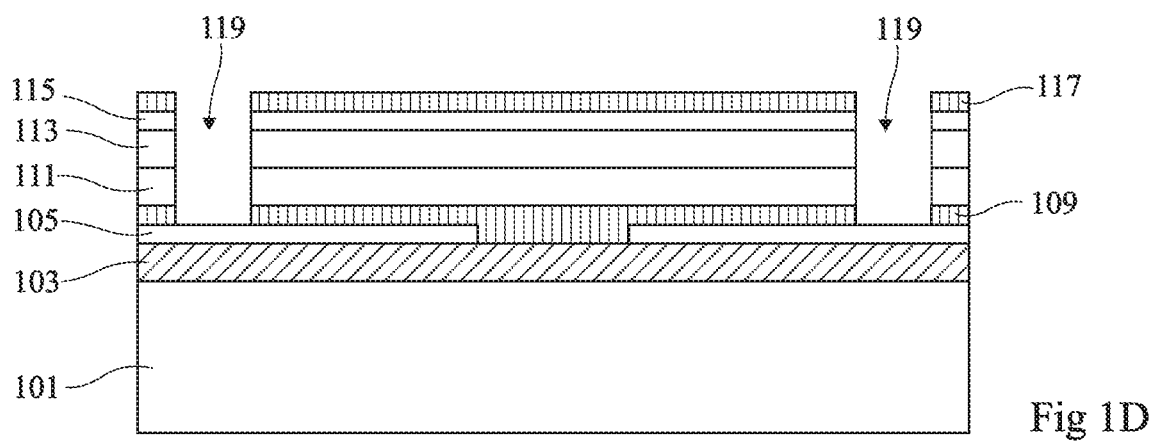

FIG. 1D illustrates a step subsequent to the deposition of layers 109, 111, 113, 115, and 117, during which a trench 119 delimiting the contour of the battery is formed from the upper surface of the assembly, in the stack formed by layers 109, 111, 113, 115, and 117. In this example, trench 119 crosses layers 117, 115, 113, 111, and 109 and substantially stops at the level of the upper surface of passivation layer 105. Trench 119 is for example formed by laser etching, for example, by means of a laser of type Nd:YAG. As an example, trench 119 has a width in the range from 50 to 500 μm. In top view, the trench forms a closed contour defining the shape of the battery. All types of battery shapes may be envisaged according to the needs of the application, for example, a square, rectangular, circular, oval, etc. shape. As a variation, trench 119 may be formed in a plurality of successive laser etch steps, by decreasing the width of the laser etching beam between two steps to give a stepped structure to the trench sides.

Figure 1E:
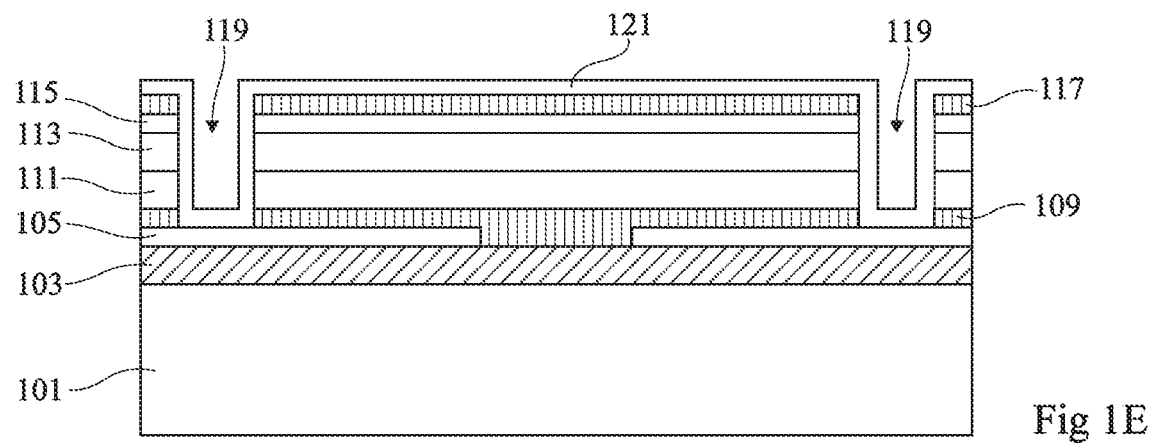

FIG. 1E illustrates a step subsequent to the forming of trench 119, during which a passivation layer 121, for example, made of alumina, is deposited on the upper surface of layer 117, as well as on the lateral walls and on the bottom of trenches 119. Layer 121 is for example deposited by a conformal deposition method of ALD type ("Atomic Layer Deposition"). As an example, layer 121 has a thickness in the range from 50 nm to 1 μm.

Figure 1F:
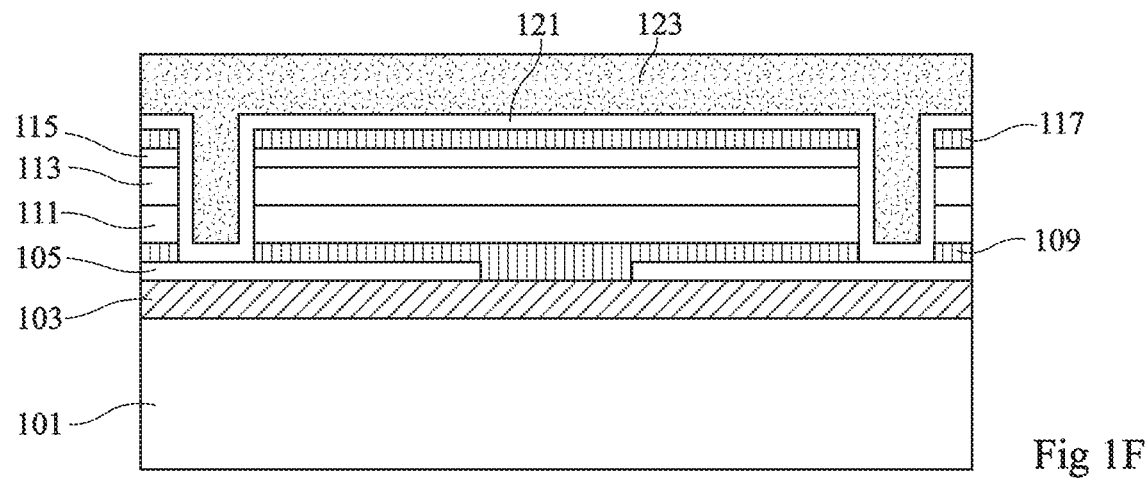

FIG. 1F illustrates a step subsequent to the deposition of passivation layer 121, during which a layer 123 of protection polymer resin is deposited on the upper surface of the assembly, totally or partially filling trenches 119 and coating the upper surface of layer 121. As an example, layer 123 has a thickness in the range from 1 to 50 μm.

Figure 1G:
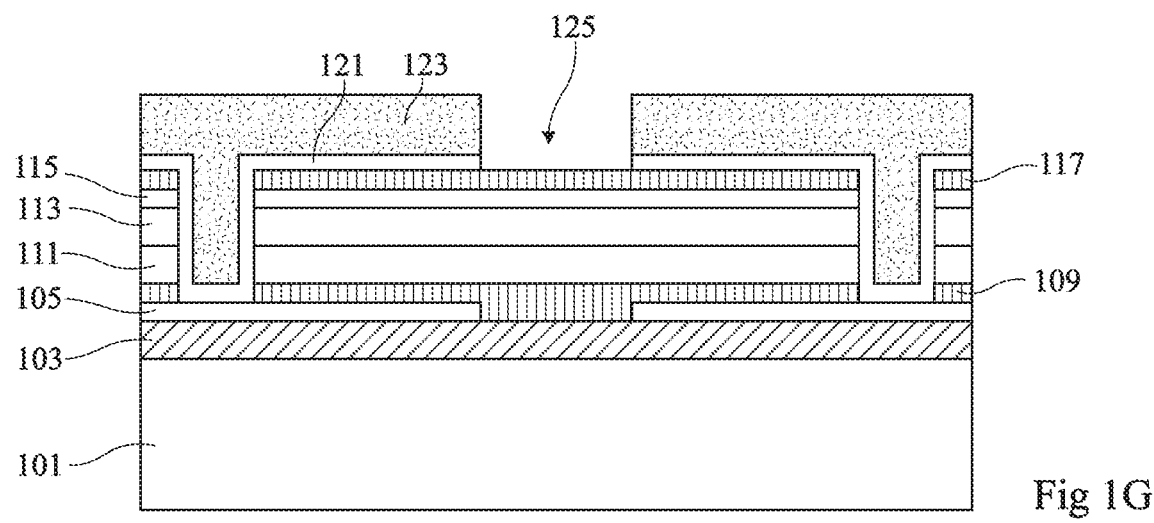

FIG. 1G illustrates a step of forming, from the upper surface of the assembly, an opening 125 in protection and passivation layers 123 and 121, for example, in a central area of the battery or, more generally, in a non-peripheral area of the battery (that is, which does not extend all the way to an edge of the battery). Opening 125 extends across the entire thickness of layers 123 and 121, and is intended to enable to take an electric contact on the upper surface of metal layer 117 during a subsequent step. Opening 125 is for example formed by laser etching, for example, by means of an excimer laser. In top view, opening 125 for example has a square, rectangular, circular, or oval shape. As an example, opening 125 has a surface area in the range from 4 $\mu m^2$ to 0.25 $cm^2$. Opening 125 is for example substantially arranged opposite the contact region between layers 103 and 109, that is, opposite opening 107 of FIG. 1B.

Figure 1H:
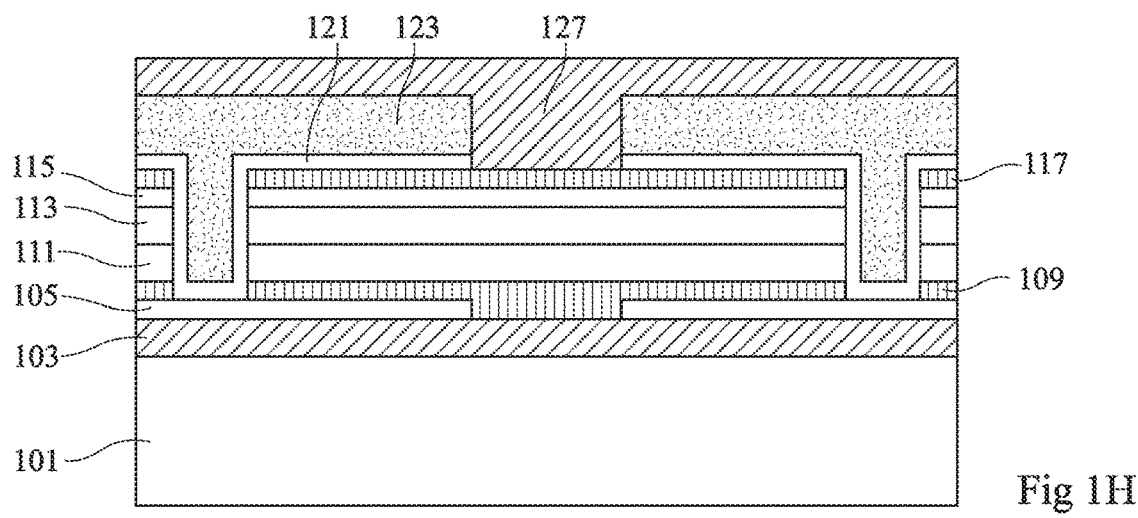

FIG. 1H illustrates a step of depositing, on the upper surface of the assembly, a metal layer 127 intended to form the second contact terminal of the battery, that is, the negative terminal in the shown example. Layer 127 is in contact with the upper surface of layer 121 and, at the level of opening 125, with the upper surface of anode collector layer 117. Layer 127 is for example made of copper, aluminum, platinum, molybdenum, or Inconel. As an example, layer 127 has a thickness in the range from 1 to 10 μm.

Figure 1I:
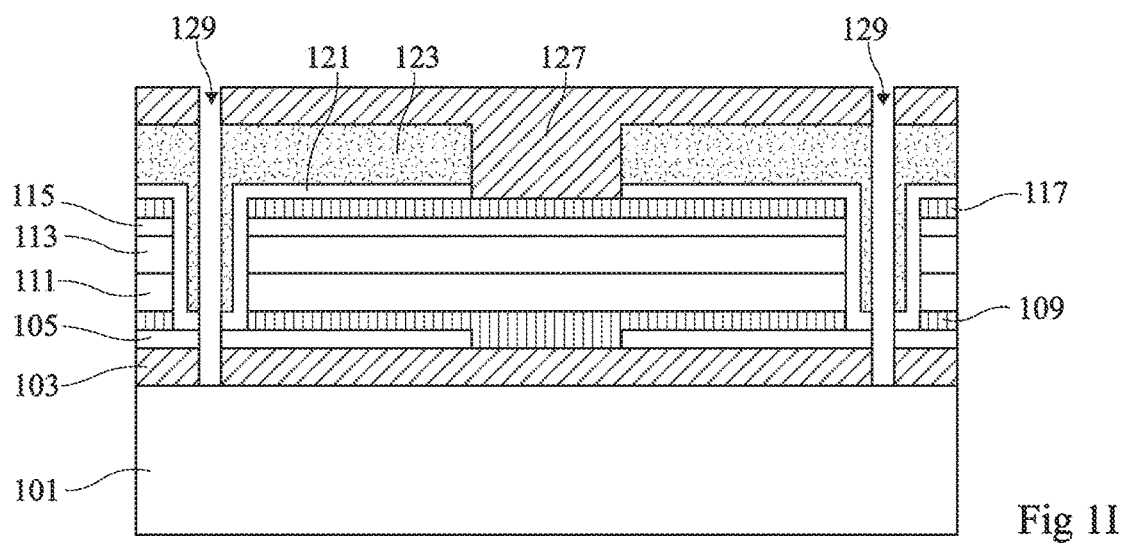

FIG. 1I illustrates a step subsequent to the deposition of layer 127, during which a trench 129 delimiting the battery contour is formed from the upper surface of the assembly. Trench 129 is substantially aligned with trench 119 of FIG. 1D, but has a width smaller than that of trench 119. Trench 129 crosses layers 127, 123, 121, 105, and 103, and substantially stops on the upper surface of substrate 101. The width of trench 129 is preferably selected so that a non-zero thickness of resin 123, for example, a thickness of approximately 10 μm, remains on the lateral sides of the battery (at the level of the substantially vertical portion of layer 121) after the forming of the trench. Trench 129 for example has a thickness in the range from 30 to 480 μm. Trench 129 is for example formed by laser etching, for example, by means of a laser of Nd:YAG type.

Figure 1J:
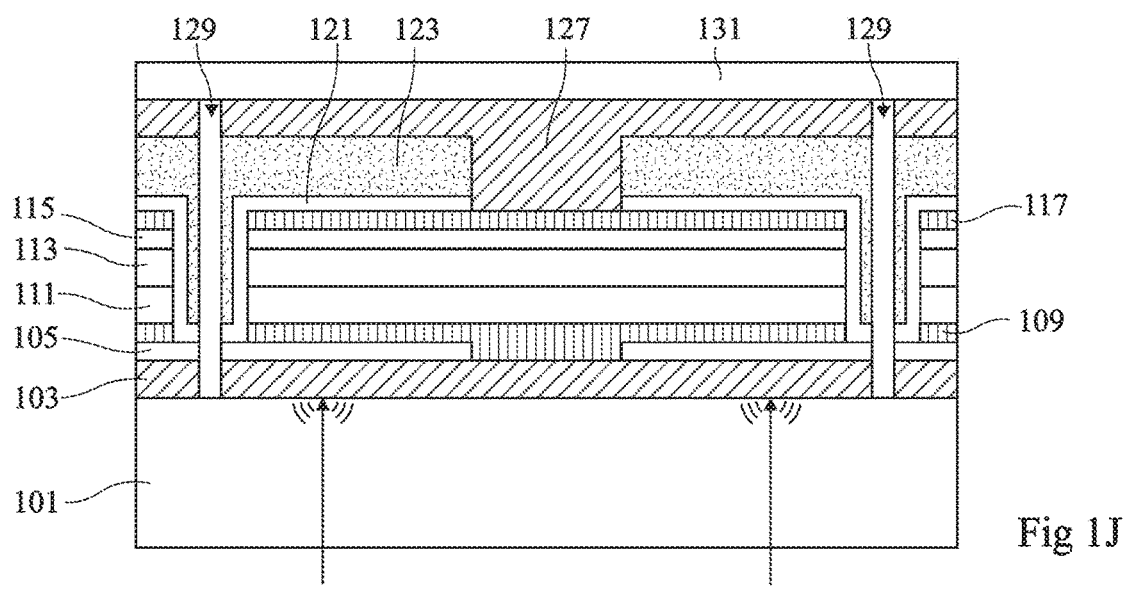

FIG. 1J illustrates a step subsequent to the step of forming trench 129, during which film 131, for example, a resilient film, is bonded to the upper surface of the assembly. Film 131 is for example a self-adhesive film having its self-adhesive surface arranged in contact with the upper surface of metal layer 127. As a variation, film 131 is bonded by means of a glue layer previously deposited on the upper surface of metal layer 127. Film 131 is assembled on a support, not shown, and has the function of holding the battery by its upper surface during a subsequent step of removal of support substrate 101.

Figure 1K:
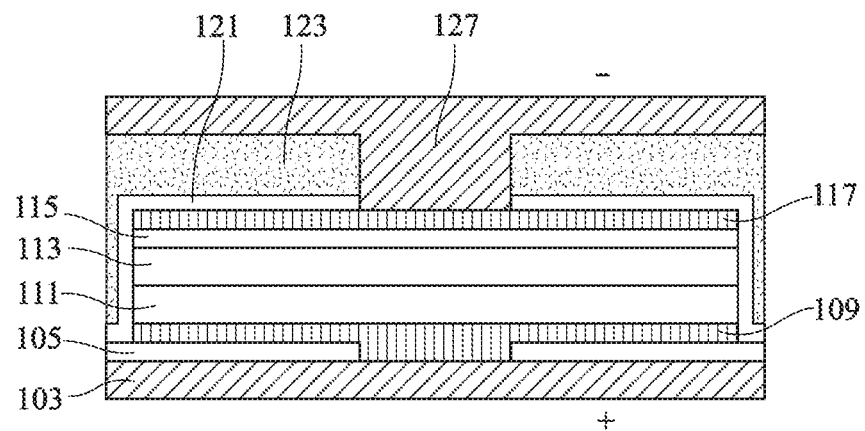

FIG. 1J further illustrates a step subsequent to the arranging of film 131, during which support substrate 101 is separated from metal layer 103 by means of a laser beam projected form the lower surface of the assembly, through substrate 101. The wavelength of the laser may be selected so that, at this wavelength, substrate 101 is substantially transparent and metal layer 103 is opaque or reflective. Thus, as it reaches layer 103, the laser creates a shock wave resulting in breaking the bonds between the substrate and layer 103. As an example, an excimer laser may be used to perform this operation. The result is shown in FIG. 1K.

Once substrate 101 has been removed, the battery may be separated from film 131. A self-supporting thin-film battery, that is, comprising no support substrate, such as illustrated in FIG. 1K, is then obtained.

It should be noted that in FIGS. 1A to 1K, a single battery has been shown. In practice, the described method may be used to simultaneously form a plurality of batteries from a same support substrate.

The batteries thus formed have the advantage of being particularly thin, and thus flexible, since they comprise no support substrate. As an example, the method described in relation with FIGS. 1A to 1K enables to form batteries having a total thickness in the range from 20 to 50 µm.

Further, batteries obtained by the method described in relation with FIGS. 1A to 1K have the advantage of having their positive and negative contact terminals respectively formed by layers 103 and 127, arranged on opposite surfaces of the batteries, and capable of being oriented in opposite directions. Such an arrangement of the contact terminals is well adapted to the forming of a stack of interconnected batteries, to increase the capacity and/or the voltage available for an application. More specifically, N batteries of the type shown in FIG. 1K, N being an integer greater than 1, may be stacked so that each battery, except for the first battery in the stack, has its positive contact terminal 103 in contact with negative contact terminal 127 of the battery of previous rank. This amounts to connecting the N batteries in series and enables to have, between positive terminal 103 of the first battery and negative terminal 127 of the last battery, of a voltage equal to N times the voltage of a battery. As a variation, two batteries of the type shown in FIG. 1K may be stacked head-to-tail, so that the two batteries have their negative contact terminals 127 in contact with each other. A first connection element may be connected to negative terminals 127, and a second connection element may be connected to positive terminals 103. This amounts to connecting the two batteries in parallel and enables to have, between the two connection elements, a voltage equal to the voltage of a battery, and a capacity equal to twice the capacity of a battery.

Another advantage of the battery of FIG. 1K is that it comprises an encapsulation layer 105, 121 totally surrounding the stack formed by active layers 109, 111, 113, 115, and 117 of the battery, except for the lower and upper contacting regions corresponding to openings 107 of FIG. 1B and 125 of FIG. 1G.

In addition to the above-mentioned advantages, the method described in relation with FIGS. 1A to 1K has the advantage that each of the battery layers may be deposited "full plate", that is, over the entire surface of the assembly, the shape of the batteries being determined during the cutting operations of FIGS. 1D and 1I. Thus, the described method does not require using shadow masks, which enables to gain battery manufacturing density and leaves a great freedom as to the shape given to the batteries.

Another advantage of the method described in relation with FIGS. 1A to 1K is that, once separated, support substrate 101 may be used again to form other batteries, which enables to minimize costs.

Figure 2:
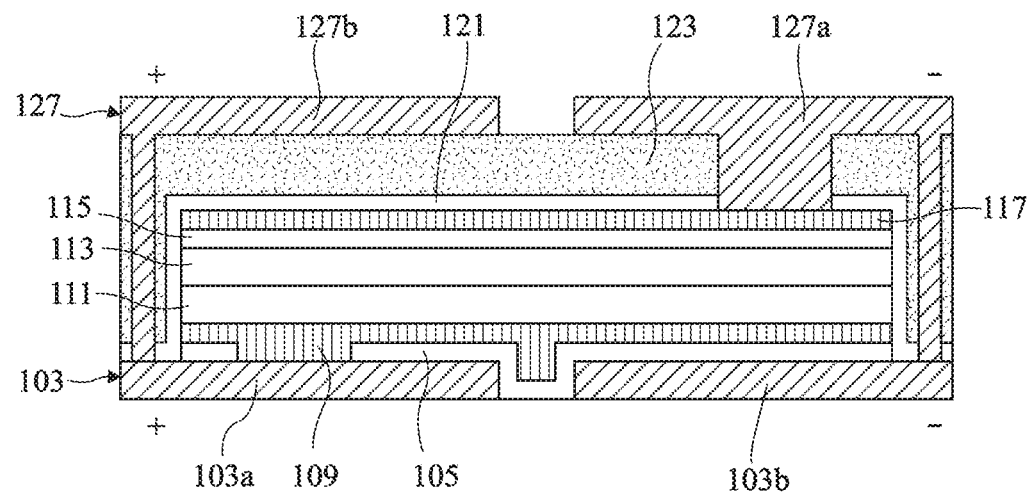
FIG. 2 is a cross-section view schematically illustrating a variation of the method of FIGS. 1A to 1K.

FIG. 2 illustrates an alternative embodiment of the battery of FIG. 1K.

The battery of FIG. 2 is a self-supporting battery which differs from the battery of FIG. 1K essentially in that, in the battery of FIG. 1K, metal layer 103, respectively 127, is a continuous layer substantially occupying the entire surface of the battery and defining a positive, respectively negative, contact terminal of the battery, while in the battery of FIG. 2, metal layer 103, respectively 127, is interrupted and comprises two non-connected regions 103a and 103b, respectively 127a and 127b. As an example, region 103a is located opposite region 127b, and region 103b is located opposite region 127a. Region 103a (at the bottom left in the shown example) is connected to cathode collector layer 109 and corresponds to a first positive contact terminal of the battery, and region 127a (at the top right in the shown example) is connected to anode collector layer 117 and corresponds to a first negative contact terminal of the battery. Region 103b (at the bottom right in the shown example) is not connected to cathode collector layer 109 but is connected to region 127a by a through conductive via. Region 103b corresponds to a second negative contact terminal of the battery. Region 127b (at the top left in the shown example) is not connected to anode collector layer 117 but is connected to region 103a by a through conductive via. Region 127b corresponds to a second positive contact terminal of the battery.

An advantage of the battery of FIG. 2 is that each of its connection surfaces comprises a positive contact terminal and a negative contact terminal. This enables to increase the possibilities of interconnection of the batteries when the latter are stacked. As an example, N batteries of the type shown in FIG. 2, N being an integer greater than 1, may be stacked so that each battery, except for the first battery in the stack, has its lower positive contact terminal 103a in contact with the upper positive contact terminal 127b of the battery of previous rank, and has its lower negative contact terminal 103b in contact with upper negative contact terminal 127a. This amounts to connecting the N batteries in parallel and enables to have, between positive terminal 103a and negative terminal 103b of the last battery in the stack, and/or between positive terminal 127b and negative terminal 127a of the last battery in the stack, a voltage equal to the voltage of a battery and a capacity equal to N times the capacity of a battery. As a variation, the N batteries may be stacked so that each battery, except for the first battery in the stack, has its lower positive contact terminal 103a in contact with the negative contact terminal 127a of the battery of previous rank, and has its lower negative contact terminal 103b opposite upper positive contact terminal 127b of the battery of previous rank, and insulated from terminal 127b of the battery of previous rank by a passivation. This amounts to connecting the N batteries in series and provides, between lower negative terminal 103b of the first battery in the stack and upper positive terminal 127b of the last battery in the stack, a voltage equal to N times the voltage of a battery.

To form the battery of FIG. 2, the method described in relation with FIGS. 1A to 1K may for example be modified as follows.

At the step described in relation with FIG. 1A, prior to the deposition of passivation layer 105, a trench delimiting the two contact areas 103a and 103b may be formed in lower metal layer 103, this trench crossing the entire thickness of layer 103 and substantially stopping at the surface of substrate 101. In top view, this trench thoroughly crosses the battery, so that at the end of the method, contact terminals 103a and 103b are insulated from each other. Passivation layer 105 is then deposited on the upper surface of layer 103 as well as on the lateral walls and the bottom of the trench delimiting contact terminals 103a and 103b.

At the step described in relation with FIG. 1B, opening 107 is formed opposite contact terminal 103a, for example in a central area of terminal 103a, or, more generally, in a non-peripheral area of terminal 103a.

The steps of FIGS. 1C to 1K may for example be carried out substantially in the same way as what has been previously described, while ascertaining that opening 125 of FIG. 1G is located opposite a central region or, more generally a non-peripheral region of the future connection terminal 127a. After the deposition of upper metal layer 127, a trench delimiting the two contact areas 127a and 127b may be formed in layer 127, this trench crossing the entire thickness of layer 127 and substantially stopping at the surface of resin layer 121. In top view, this trench thoroughly crosses the battery, so that at the end of the method, contact terminals 127a and 127b are insulated from each other. A vertical through conductive via connecting contact terminal 103a to contact terminal 127b may be formed at the level of resin region 121 located on the left-hand side of the battery (between the left-hand edge of the battery and the substantially vertical portion of passivation layer 121 located on the side of the left-hand edge of the battery). Another vertical through conductive via connecting contact terminal 103b to contact terminal 127a may be formed at the level of resin region 121 located on the right-hand side of the battery (between the right-hand edge of the battery and the substantially vertical portion of passivation layer 121 located on the side of the right-hand edge of the battery).

Specific embodiments have been described. Various alterations, modifications, and improvements will occur to those skilled in the art. In particular, in relation with FIGS. 1A to 1K and 2, examples of methods of thin-film battery manufacturing where cathode collector 109 and cathode layer 111 are deposited before electrolyte 113, anode layer 115, and anode collector 117, have been described. The described embodiments are however not limited to this specific case. It will be within the abilities of those skilled in the art to adapt the described method by inverting the order of deposition of the cathode and anode elements.

Further, the described embodiments are not limited to the examples of materials mentioned as an example in the description, in particular as concerns the anode and cathode collectors, the anode and cathode layers, and the electrolyte layer.

Further, the described embodiments are not limited to the examples of dimensions mentioned in the present disclosure.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A thin-film battery, comprising:
a vertical active stack having as a lower layer a metal layer having formed therein a first contact terminal of a first polarity of the battery and having as an upper layer a metal layer having formed therein a second contact terminal of a second polarity of the battery;
wherein the lower layer further comprises a third contact terminal of second polarity of the battery connected by a first conductive via to the second contact terminal, and
wherein the upper layer further comprises a fourth contact terminal of first polarity of the battery connected by a second conductive via to the first contact terminal.

2. The thin-film battery of claim 1, further comprising a passivation structure surrounding the vertical active stack.

3. The thin-film battery of claim 2, wherein the first and second conductive vias extend through the passivation structure.

4. The thin-film battery of claim 2, wherein the passivation structure comprises a first passivation layer on a bottom surface of the lower metal layer and a second passivation layer on a top surface of the upper metal layer and on side edges of the vertical active stack.

5. The thin-film battery of claim 2, further comprising a polymer resin coating at least a portion of the passivation structure, wherein the first and second conductive vias extend through the polymer resin.

6. A thin-film battery, comprising:
a vertical stack comprising a first metal layer and a second metal layer and wherein active battery layers are positioned between the first metal layer and the second metal layer;
a passivation structure which surrounds the vertical stack on a top side, a bottom side and lateral wall side;
a first opening in the passivation structure at the top side through which electrical connection is made to the first metal layer; and
a second opening in the passivation structure at the bottom side through which electrical connection is made to the second metal layer.

7. The thin-film battery of claim 6, wherein the active battery layers comprise a cathode layer, and electrolyte layer and an anode layer.

8. The thin-film battery of claim 6, wherein the bottom side of the passivation structure comprises a first passivation layer on a bottom surface of the first metal layer and wherein the top side and lateral wall side of the passivation structure comprises a second passivation layer on a top surface of the second metal layer and on side edges of the first metal layer, second metal layer and the active battery layers.

9. The thin-film battery of claim 8, further comprising a polymer resin coating the second passivation layer.

10. The thin-film battery of claim 9, wherein the polymer resin coating includes a third opening aligned with the second opening, and further including:
a first battery electrode mounted to the passivation structure and in electrical contact with the first metal layer through the first opening; and
a second battery electrode mounted to the polymer resin coating and in electrical contact with the second metal layer through the second and third openings.

11. The thin-film battery of claim 10, further comprising:
a third battery electrode mounted to the passivation structure and in electrical contact with the second battery electrode; and
a fourth battery electrode mounted to the polymer resin coating and in electrical contact with the first battery electrode.

12. The thin-film battery of claim 11, further including:
a first via extending through the polymer resin coating to make electrical contact between the second and third battery electrodes; and
a second via extending through the polymer resin coating to make electrical contact between the first and fourth battery electrodes.

13. The thin-film battery of claim 12, wherein the first and second vias also extend through the passivation structure.

14. A thin-film battery, comprising:
a vertical stack comprising a first metal layer and a second metal layer and wherein active battery layers are positioned between the first metal layer and the second metal layer;
a passivation structure which surrounds the vertical stack on all sides;
a first opening in the passivation structure through which electrical connection is made to the first metal layer;
a second opening in the passivation structure through which electrical connection is made to the second metal layer;
a first battery electrode mounted to the passivation structure and in electrical contact with the first metal layer through the first opening; and
a second battery electrode in electrical contact with the second metal layer through the second opening.

15. The thin-film battery of claim 14, further comprising:
a third battery electrode mounted to the passivation structure and in electrical contact with the second battery electrode; and
a fourth battery electrode mounted to the polymer resin coating and in electrical contact with the first battery electrode.

16. The thin-film battery of claim 15, further including:
a first via extending to make electrical contact between the second and third battery electrodes; and
a second via extending to make electrical contact between the first and fourth battery electrodes.

17. The thin-film battery of claim 16, wherein the first and second vias extend through the passivation structure.

18. A thin-film battery, comprising:
a vertical stack comprising a first metal layer and a second metal layer and wherein active battery layers are positioned between the first metal layer and the second metal layer;
a passivation structure which surrounds the vertical stack on a top side, a bottom side and lateral wall side;
a polymer resin coating on the passivation structure at the top side;
a first opening extending through the passivation structure at the bottom side;
a second opening extending through the polymer resin and the passivation structure at the top side;
a first battery electrode mounted to the passivation structure at the bottom side, said first battery electrode making in electrical contact with the first metal layer through the first opening; and
a second battery electrode mounted to the polymer resin coating, said second battery electrode making electrical contact with the second metal layer through the second opening.

19. The thin-film battery of claim 18, wherein the polymer resin coating further extends on the passivation structure at the lateral wall side.

20. The thin-film battery of claim 18, further comprising:
a third battery electrode mounted to the passivation structure and in electrical contact with the second battery electrode; and
a fourth battery electrode mounted to the polymer resin coating and in electrical contact with the first battery electrode.

21. The thin-film battery of claim 20, further including:
a first via extending through the polymer resin coating to make electrical contact between the second and third battery electrodes; and
a second via extending through the polymer resin coating to make electrical contact between the first and fourth battery electrodes.

22. The thin-film battery of claim 21, wherein the first and second vias also extend through the passivation structure.

* * * * *